Patented Jan. 22, 1924.

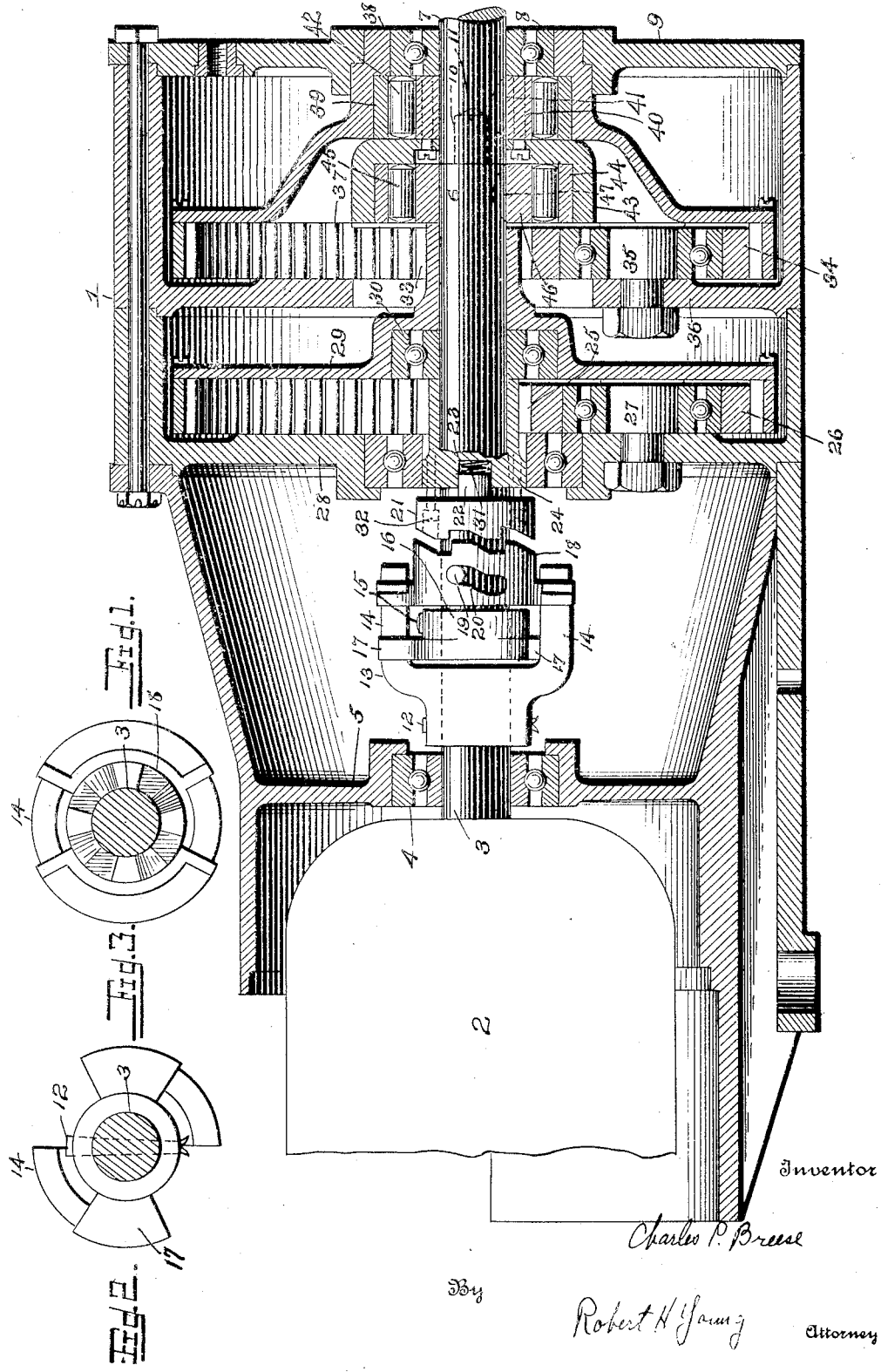

1,481,345

UNITED STATES PATENT OFFICE.

CHARLES P. BREESE, OF DAYTON, OHIO.

AUTOMATIC POWER-TRANSMISSION DRIVE GEAR.

Application filed April 8, 1921. Serial No. 459,532.

*To all whom it may concern:*

Be it known that I, CHARLES P. BREESE, a citizen of the United States, residing at Dayton, in the county of Montgomery and State of Ohio, have invented certain new and useful Improvements in Automatic Power-Transmission Drive Gears, of which the following is a specification.

This invention relates to automatic power transmission drive gear, the main object of the invention being to provide for a large gear ratio when the power is applied to one end of the gearing, and a straight or direct drive when power is applied to the other end of the gearing. When the straight drive is in operation the gears producing the differential ratio are automatically drawn out of operation and furthermore all of said gears remain idle until the high ratio gear is desired.

While the invention is particularly designed for starting an internal combustion engine, and especially an aeronautical engine, it will become apparent as the description proceeds that the improved gearing is applicable in other places and for various other purposes which will suggest themselves.

With the above and other objects in view the invention consists in the novel construction, combination and arrangement herein fully described, illustrated and claimed.

In the accompanying drawings,

Figure 1 is a diametrical section through the improved automatic power transmission drive gear;

Figure 2 is a cross section through the same taken on the left of the driving member 12;

Figure 3 is a transverse section taken between the clutch members 18 and 21.

In the illustrated embodiment of the invention 1 designates a gear case or housing which may be of sufficient dimensions to enclose the entire gearing and also retain oil or form an oil chamber adapting the gear wheels, pinions and the like to run in a suitable lubricant.

2 designates a motor generator and 3 the shaft thereof, the latter being journaled in a radial ball bearing 4 supported by a web 5 of the casing 1.

The axial alinement with the shaft 2 is what will be hereinafter termed a transmission shaft 6, and in axial alinement with both of said shafts 3 and 6 is what will hereinafter be termed a power shaft 7. In engine starting practice, the shaft 7 may constitute the engine shaft or a shaft directly or indirectly connected with the engine shaft and adapted to be driven by the engine when the latter takes up its cycle of operation. The shaft 7 is journaled in a radial ball bearing 8 supported, as shown, by an end wall 9 of the casing. The shafts 6 and 7 are maintained in alinement by providing one of such shafts with a tenon 10 and the other shaft with a mortise 11 to receive said tenon.

Fastened to one end of the shaft 3 by means of a pin or key 12, or the equivalent thereof, is a driving member 13 which is shown as comprising oppositely arranged and substantially parallel arms 14. Secured to the adjacent end of the transmission shaft 6 by means of a suitable fastening device 15 is a collar 16 having one or more radially projecting lugs 17 which lie between the arms 14 of the driving member 13, the lugs 17 being of less circumferential widths than the distance between the arms 14 so as to provide for a certain limited amount of relative rotative movement between the shafts 3 and 6, the purpose of which will presently appear.

18 designates a shiftable clutch which is mounted loosely upon the transmission shaft 6 and capable of both a partial rotative movement thereon and a slight movement longitudinally of said shaft 6. The shaft 6 has projecting therefrom a stud or thrust pin 19 which is received in an inclined slot or way 20 in the clutch member 18, said pin 19 therefore operating to slide the clutch member 18 longitudinally upon the shaft 6 when said shaft is partially rotated or when the clutch member 18 is partially rotated. The teeth or jaws of the clutch member 18 are adapted to engage the teeth or jaws of a complemental clutch member 21 which is also loose on the shaft 6 and which has one or more projections 22 which engage in corresponding notches 23 in the hub 24 of a pinion 25 loose on the shaft 6. The pinion 25 meshes with a spur gear wheel 26 journaled on a stud 27 secured to an intermediate web 28 of the casing 1. The gear wheel 26 meshes with an internal gear 29 supported by radial ball bearing 30 surrounding the shaft 3. The clutch member 21 is yieldingly thrust toward the clutch member 13 by means of one or more springs 31 and such movement of the clutch member 21 is limited by means of stops shown in the form of adjustable headed screws 32 which pass through openings in the clutch member 21 and screw into sockets in the hub 24 of the pinion 25.

The hub of the internal gear 29 has fast thereon a pinion 33 which meshes with and drives a gear wheel 34 journaled upon a stud 35 carried by another web 36 of the casing 1. The gear wheel 34 meshes with an internal gear 37, the latter being supported within an opening 38 in the end wall 9 of the casing and being supported by the radial ball bearing 8 above referred to. The hub of the gear 37 is formed with a central recess containing an annular internal clutch facing 39 which encircles a clutch collar 40 fastened to the shaft 7 by means of a key 41 and having one or more exterior cam faces which engage clutch members 42, shown in the form of rollers which afford a gripping means between the clutch members 39 and 40, the construction just described constituting an overrunning clutch.

Adjacent to the overrunning clutch just described there is another overrunning clutch comprising an outer member 43 which has a fixed relation to the shaft 7 being shown as fastened to the collar 40. The clutch member 43 has an internal clutch facing 44 engaged by one or more clutch members 45, similar to the members 42 and also engaged by one or more cam faces on the outside of a clutch collar 46 shown as fastened to the transmission shaft 6 by means of a key 47.

The operation of the gearing hereinabove described is as follows. Power being applied to the shaft 3, the driving member 13 will rotate in relation to the collar 16 as far as it is permitted to do so by reason of the circumferential gaps left between the lugs 17 and the arms 14. This movement is, however, of sufficient extent to admit of the necessary relative rotative movement between the pin 19 and the clutch member 18 to advance said clutch member into positive driving engagement with the complemental clutch member 21. Motion is thereby transmitted to the pinion 25 and through the two series of pinions and internal gears to the power shaft 7. The clutch member 18 cannot turn relatively to the driving member 13 but is advanced thereby toward the clutch member 21, the transmission shaft 6 being driven by the engagement between the members 13 and 16.

Should the teeth or jaws of the clutch members 18 and 32 be brought into contact before engagement, at their tips, the springs 31 act as a relief, preventing the teeth or jaws from clashing. The overrunning clutch, comprising the members 39, 40 and 42, seizes or becomes operative if the power is applied to the member 39, and if the power is applied to the cam 40, said clutch releases and overruns. In the case being described the power is applied to the member 39 and consequently the clutch takes hold and drives the shaft 7. At the same time the adjacent clutch, comprising the members 43, 45 and 46, releases. Now should the power be applied on the shaft 7 instead of the shaft 3, as previously described, the power is transmitted first through the cam 40 and that clutch releases, then through 43 and 45 and that clutch seizes, transmitting the power through the shaft 6 to the collar 16 which rotates partially in relation to the clutch member 18 and the driving member 13 as hereinabove described. This causes the clutch member 18 to be moved longitudinally of the transmission shaft 6 disengaging the jaws of the clutch members 18 and 21 and throwing all of the gear wheels and the entire train of gearing out of operation, all of the gear wheels remaining idle. The power is then transmitted by the collar 16 to the driving member 13 and hence to the shaft 3 of the motor generator 2.

It will, of course, be obvious that the number of drive units or, in other words, the internal gears and pinions and other gear wheels associated therewith may be varied and also that other changes may be made in the form, proportion and minor details of construction without departing from the principle or sacrificing any of the advantages of the invention.

I claim:

1. The combination of a starter shaft, a power shaft adapted to be driven thereby, a transmission shaft, speed-ratio changing gearing to connect the starter shaft with said power shaft, automatic releasing means to throw said gearing out of operation when the speed of the power shaft exceeds the speed of the starter shaft, clutch means operating automatically under the last named condition to connect the power shaft with the transmission shaft, a driving connection between the transmission shaft and the starter shaft and a second automatic clutch and release means to connect said gearing with the starter shaft.

2. The combination of a starter shaft, a power shaft adapted to be driven thereby, a transmission shaft, speed-ratio changing gearing to connect the starter shaft with said power shaft, an overrunning clutch between said gearing and the power shaft, clutch means operating automatically when the speed of the power shaft exceeds that of the gearing to connect the power shaft with the transmission shaft, a driving connection between the transmission shaft and the starter shaft, and a self releasing clutch between the starter shaft and said gearing.

3. The combination of a starter shaft, a power shaft to be driven thereby, a transmission shaft between the starter shaft and the power shaft, said shafts being in axial alinement, speed-ratio reducing gearing between said transmission and power shafts, means to automatically disconnect said gearing when the speed of the power shaft exceeds that of the gearing, and means to automatically connect the power shaft with the starter shaft under the last named condition.

4. The combination of a starter shaft, a power shaft adapted to be driven thereby, a transmission shaft, speed-ratio changing gearing to connect the starter shaft with said power shaft, an overrunning clutch between said gearing and the power shaft, clutch means operating automatically when the speed of the power shaft exceeds that of the gearing to connect the power shaft with the transmission shaft, a driving connection between the transmission shaft and the starter shaft, and a self releasing clutch between the starter shaft and said gearing, all of said shafts being in axial alinement.

In testimony whereof I have affixed my signature.

CHARLES P. BREESE.